(12) United States Patent
Ross et al.

(10) Patent No.: US 10,816,097 B2
(45) Date of Patent: Oct. 27, 2020

(54) ARRANGEMENT FOR CONDUCTING, TREATING AND/OR MEASURING A FLUID

(71) Applicants: DIEHL METERING GMBH, Ansbach (DE); DIEHL METERING S.A.S., Saint Louis (FR)

(72) Inventors: Benjamin Ross, Schmallenberg (DE); Jan Neidinger, Willstaett (DE); Oliver Schlegel, Murr (DE); Benjamin Fischer, Karlsbad (DE); Michael Schimetzki, Karlsruhe (DE); Chinh-Duc Nguyen, Pforzheim (DE)

(73) Assignees: Diehl Metering GmbH, Ansbach (DE); Diehl Metering S.A.S., Saint Louis (FR)

( * ) Notice: Subject to any disclaimer, the term of this patent is extended or adjusted under 35 U.S.C. 154(b) by 0 days.

(21) Appl. No.: 15/972,483

(22) Filed: May 7, 2018

(65) Prior Publication Data
US 2018/0320792 A1 Nov. 8, 2018

(30) Foreign Application Priority Data

May 5, 2017 (DE) .......................... 10 2017 004 372

(51) Int. Cl.
| | | |
|---|---|---|
| *F16K 5/04* | (2006.01) | |
| *E03B 7/07* | (2006.01) | |
| *E03B 7/09* | (2006.01) | |
| *F16K 5/02* | (2006.01) | |

(52) U.S. Cl.
CPC ............ *F16K 5/0407* (2013.01); *E03B 7/075* (2013.01); *E03B 7/095* (2013.01); *F16K 5/0457* (2013.01); *F16K 5/0257* (2013.01)

(58) Field of Classification Search
CPC .......... E03B 7/075; E03B 7/095; E03B 7/074; E03B 7/078; E03B 7/07; F16K 5/0407; F16K 5/0457; F16K 5/0421; F16K 5/0492; F16K 5/0257
USPC ................................................. 251/309, 312
See application file for complete search history.

(56) References Cited

U.S. PATENT DOCUMENTS

| | | | | |
|---|---|---|---|---|
| 3,563,512 A | * | 2/1971 | Hauffe | .................... F16K 5/045 251/312 |
| 4,605,036 A | * | 8/1986 | Smith | .................... F16K 5/0435 137/327 |
| 5,706,851 A | * | 1/1998 | Lopez-Gomez | ...... F16K 5/0407 137/246.22 |

(Continued)

FOREIGN PATENT DOCUMENTS

| | | |
|---|---|---|
| CA | 1312323 C | 1/1993 |
| DE | 68903963 T2 | 4/1993 |

(Continued)

*Primary Examiner* — Kelsey E Cary
(74) *Attorney, Agent, or Firm* — Laurence A. Greenberg; Werner H. Stemer; Ralph E. Locher

(57) ABSTRACT

A configuration for installation into a pipeline of a fluid network. The configuration has a connection housing with an inlet, an outlet, and a connection opening for connection of an exchangeable functional unit. The connection housing has a rotatably arranged core piece whose rotation makes it possible for the throughflow of the fluid through the connection housing to be blocked and/or released. The core piece has a receptacle for connection of the functional unit, and the receptacle and the connection opening are oriented in the same direction.

14 Claims, 5 Drawing Sheets

(56) References Cited

U.S. PATENT DOCUMENTS

2004/0021120 A1* 2/2004 Turnau, III ........... F16K 5/0414
251/309
2007/0181191 A1* 8/2007 Wittig ..................... F16K 11/20
137/551

FOREIGN PATENT DOCUMENTS

| | | |
|---|---|---|
| DE | 202007007854 U1 | 11/2008 |
| DE | 202015101027 U1 | 7/2016 |
| EP | 2385280 A1 | 11/2011 |
| EP | 2390540 A1 | 11/2011 |
| GB | 2246638 A | 2/1992 |
| NL | 8302467 A | 2/1985 |
| WO | 2014029347 A1 | 2/2014 |

* cited by examiner

ARRANGEMENT FOR CONDUCTING, TREATING AND/OR MEASURING A FLUID

CROSS-REFERENCE TO RELATED APPLICATION

This application claims the priority, under 35 U.S.C. § 119, of German application DE 10 2017 004 372.8, filed May 5, 2017; the prior application is herewith incorporated by reference in its entirety.

BACKGROUND OF THE INVENTION

Field of the Invention

The present invention relates to an arrangement for installation into a pipeline of a fluid network. The arrangement contains a connection housing with an inlet, an outlet, and a connection opening for connection of an exchangeable functional unit.

Arrangements of the type in question are used for example in drinking water networks for connection of additional functional units to the drinking water installation by corresponding specialist personnel.

The German ordinance on the quality of water intended for human consumption (TrinkwV) stipulates for example that chemical and microbial contaminations and undesired deposits must be avoided in drinking water installations. The monitoring of the relevant general, chemical and microbiological parameters for the examination of drinking water is accordingly important here. These parameters are nowadays determined for example by way of sampling and subsequent laboratory examinations or on the basis of rapid testing carried out in the field. In the event of a limit value being exceeded, it is furthermore necessary for water treatment or decontamination to be carried out. However, the implementation of additional functions, such as for example water treatment or measurement of water parameters, inside the drinking water installations involves a high outlay in terms of fitting and costs since such additional functions have to be installed and maintained by specialist personnel.

An arrangement of the type in question is known from German utility model DE 20 2015 101 027 U1. German utility model DE 20 2015 101 027 U1 describes a connection piece for installation into a pipeline or water line, and a connection arrangement consisting of multiple connection pieces. The connection piece has an inlet and an outlet which are arranged along an axis opposite one another. The connection piece is inserted into the pipeline by means of the inlet and the outlet. It is possible via flanges arranged on the top side and bottom side for functional units (so-called water treatment devices), such as for example water softeners or water filters, to be connected to the connection piece. The respective connection piece is in this case constructed such that the water firstly flows through the connection piece and then from the connection piece through the water treatment devices. This ensures that water passes through both water treatment devices when the connection piece is flowed through. However, water throughflow cannot occur as soon as one of the water treatment devices is removed or is defective. In the case of a removal or defect, it is thus necessary for the water flow to be blocked off, for example via a main disconnection. Furthermore, the installation and the fitting of the functional units by way of flanging-on are cumbersome, prone to maintenance and require opening of the water system.

SUMMARY OF THE INVENTION

Proceeding from the prior art, the object of the present invention is to provide an arrangement in which additional functions can be installed and deinstalled in a simple, quick and low-maintenance manner, with at the same time improved safety.

According to the invention, the connection housing has a rotatably arranged core piece whose rotation makes it possible for the throughflow of the fluid through the connection housing to be blocked or released. The core piece contains a receptacle which is set up for connection of a functional unit. The receptacle and the connection opening are in this case oriented in the same direction, that is to say in the direction of connection of the functional unit, with the result that, in the connected state, the functional unit can engage into the receptacle. This makes it possible for the functional unit to be able to be inserted directly into the receptacle of the core piece. By rotation of the functional unit, the throughflow through the connection housing and the core piece is released and/or blocked, and so the work steps of installation and deinstallation of the functional unit at the same time contains the blocking and/or release of the throughflow. This allows additional functions to be implemented in a simple manner by the user and without additional specialist personnel. Moreover, the safety during the installation and deinstallation of the functional unit or the additional function is improved to a particularly high degree.

The inlet and the outlet may preferably be arranged along a throughflow axis, wherein the direction of connection of the functional unit may run orthogonally with respect to the throughflow axis. Accordingly, it is possible for the functional unit or at least a part of the functional unit to be positioned in the region of the throughflow axis. Consequently, either the functional unit is flowed through by fluid, or the fluid can be conducted, counter to the direction of connection, in the direction of the functional unit.

The core piece expediently contains a core piece inlet and a core piece outlet which are preferably arranged opposite one another, with the result that the fluid is able to flow through the core piece in that the inlet of the connection housing is connected to the core piece inlet and the outlet of the connection housing is connected to the core piece outlet.

Furthermore, the core piece inlet and the core piece outlet may in each case be connected to the receptacle. This allows the core piece inlet and the core piece outlet to be coupled to the functional unit, which engages into the receptacle, such that the fluid is able to be conducted through the functional unit or past it. As a result, it is possible for additional functions to be implemented via the functional unit, which functions selectively require fluid contact or a throughflow of fluid or no fluid contact.

Preferably, by rotating the core piece inside the connection housing, the inlet and the outlet of the connection housing, and the core piece inlet and the core piece outlet of the core piece, are brought into fluidic connection. In particular, the core piece can be oriented such that the inlet, the outlet, the core piece inlet and the core piece outlet are arranged along a common axis, in particular along the throughflow axis.

The core piece can be inserted in a simple manner into the connection opening along the direction of connection. For this purpose, the connection housing has a corresponding, in particular cylindrical or spherical, recess into which the core piece is able to be inserted. This results in the advantage that the fitting of the core piece can be realized in a simple manner. Consequently, the time for fitting and the associated costs for fitting can be reduced considerably.

It is furthermore possible for a sealing element which seals off the connection housing with respect to the core piece to be provided in the region of the inlet and/or the outlet. In this case, the sealing element is matched to the preferably cylindrical or spherical or flattened spherical contour of the core piece. For example, it is possible in a simple manner for the sealing element to be inserted into the inlet or the outlet of the connection housing or connected thereto. As a result of such sealing elements, the safety of the entire arrangement is improved to a particularly high degree. Alternatively, the sealing element may also be arranged on the core piece.

Preferably, the sealing element contains a sealing device which acts radially, in particular against the connection housing, and a sealing device which acts axially, in particular against the core piece. It is preferably possible for an O-ring to be provided as the sealing device, which is produced for example from rubber, polytetrafluoroethylene (PTFE), perfluoro rubber (FFKM, FFPM) or polyethylene (PE).

It is expediently possible for the core piece to be held rotatably inside the connection housing via a holder. For example, a cover or holding ring, which is fastened via fastening device (for example screws, pins or bolts) to corresponding fastening device (for example a thread) of the connection housing, may be provided as the holder. In this case, the holder is arranged such that the rotational movement of the core piece is not prevented. This ensures secure fastening of the core piece to and/or in the connection housing without limiting the rotation function. However, in the event of a defect, the core piece can be replaced in a simple manner by way of the deinstallation of the holder. Alternatively, it is also possible for the holder itself to comprise a thread, by way of which it can be screwed onto a corresponding thread on the connection housing.

Expediently, the functional unit may be connected to the receptacle such that said unit engages, preferably in a form-fitting manner, into the receptacle. It is preferably possible for the rotation of the core piece to be realized by the rotation of the functional unit connected to the receptacle in that a force transmission of the rotational movement from the functional unit to the core piece is ensured.

Furthermore, the functional unit may be formed such that it is able to be locked in at least one rotational position or is able to be locked to the holder and/or the connection housing. Consequently, the functional unit is held in position even when a fluid pressure prevails, as a result of which the safety is improved yet further.

Furthermore, the functional unit and the connection housing and/or the holder may have means for establishing a mechanically releasable connection between the functional unit and the connection housing and/or holder. This results in the advantage that the functional unit can be attached to the connection housing and/or the holder.

Preferably, projections are provided on the functional unit as means for establishing a mechanically releasable connection and engage into corresponding recesses of the connection housing and/or of the holder. This allows error-free installation of the functional unit to be realized in that, for example, the projections are formed such that they are able to be inserted into the recesses only in one orientation, according to a key-lock principle. It is also possible for additional configurations of the recesses, such as for example different grooves or groove forms and L-shaped recesses, to be provided, by way of which the holding function is improved yet further.

According to a preferred configuration, a bayonet closure is provided as a means for establishing a mechanically releasable connection or lock, the connecting elements of which closure, such as for example an angled recess and a projection which is able to be inserted into the angled recess, are arranged on the functional unit and the holder. This results in the advantage that the functional unit can be fixed to the connection housing and/or the holder by way of a simple rotational movement, whereby at the same time the rotational movement of the core piece is limited. The bayonet closure is also set up for prestressing the sealing device of the functional unit, of the holder, of the sealing elements and/or of the core piece.

It is expediently possible for the functional unit to have a throughflow channel which, in the connected state, is situated inside the core piece and is connected to the core piece inlet and the core piece outlet such that a flow through the functional unit is made possible.

The selection of a specific functional unit allows any additional function to be established. For this purpose, the functional unit has for example a functional device inside the throughflow channel, for example a filter, or a functional module which comprises the desired additional function. Corresponding to the respective configuration, the functional unit may be for example a placeholder functional unit, a descaling functional unit, a filtering functional unit, a monitoring functional unit, a germ reduction functional unit, a pressure reduction and/or pressure regulation functional unit, a functional unit for determining chemical and/or microbiological parameters, a data functional unit, for example for storing data, a communication functional unit, for example for radio transmission of the data occurring, a display functional unit and/or a functional unit for determining pH, electrical conductivity, nitrate, nitrite, sulphate, carbon dioxide, iron, fluoride, chlorine, copper, phosphate, silicon, ammonium, hardness, throughflow rate, temperature, carbonate, salinity, germ content and/or metal content. There are accordingly a wide variety of additional functions which can be installed in a simple manner in the fluid line network.

At the functional unit and/or in the region of the functional unit at the core piece, there are preferably provided sealing devices, such as for example O-rings, which seal off the core piece with respect to the functional unit. This allows the fluid to flow through the core piece and the functional unit without the fluid escaping at the crossover points of the individual units. The operational safety of the arrangement is improved yet further by this configuration.

According to a preferred configuration, the functional unit has its own connection geometry. Consequently, the functional unit may be connected to the connection housing, the receptacle of the core piece and/or the holder in a simple manner as a modular component prefabricated by the manufacturer. This results in the advantage that the respective arrangements and functional units allow a so-called building block design to be realized, which design offers the user the possibility of installing or deinstalling additional functions simply and quickly without the help of specialist personnel.

Other features which are considered as characteristic for the invention are set forth in the appended claims.

Although the invention is illustrated and described herein as embodied in an arrangement for conducting, treating and/or measuring a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
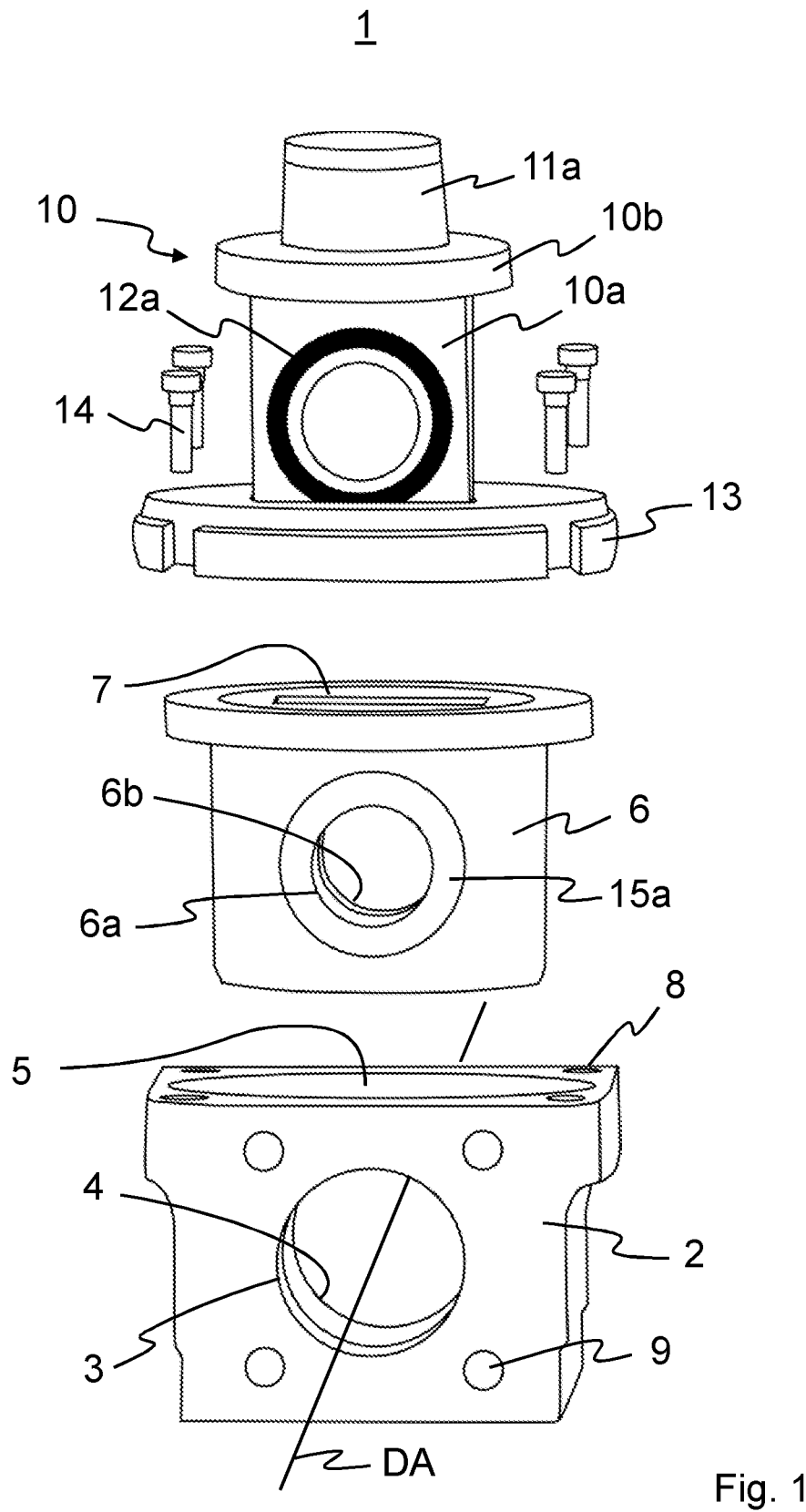
FIG. 1 is a diagrammatic, exploded perspective view of a first configuration of an arrangement according to the invention.

Referring now to the figures of the drawings in detail and first, particularly to FIG. 1 thereof, there is shown an arrangement 1 according to the invention for conducting, treating and/or determining parameters of or measuring a fluid. The arrangement 1 is part of a fluid line network (not illustrated in FIG. 1), such as for example a drinking water supply network. The arrangement 1 contains a connection housing 2 which has an inlet 3 and an outlet 4, by which the connection housing 2 is able to be inserted for example into a pipeline of the fluid line network. This may be realized for example by a connecting device (not illustrated in the figures) which engage into threaded bores 9 of the connection housing 2. The throughflow direction of the fluid is generally from the inlet 3 to the outlet 4 along a throughflow axis DA.

The connection housing 2 furthermore has a connection opening 5 to which, for example, a functional unit 10 may be connected. In a cylindrical recess inside the connection housing 2, a rotatably arranged cylindrical core piece 6 is provided below the connection opening 5. It is thus possible for the core piece 6 to be inserted in a simple manner into the cylindrical recess of the connection housing 2 via the connection opening 5 during the fitting. The core piece 6 contains a core piece inlet 6a, and a core piece outlet 6b arranged opposite, by which the fluid is able to flow through the core piece 6 from the core piece inlet 6a to the core piece outlet along the throughflow axis DA. Accordingly, by rotating the core piece 6, it is possible for the throughflow of the fluid through the connection housing 2 to be blocked in that, by rotating the core piece 6, the core piece inlet 6a and the core piece outlet 6b are rotated away from the alignment of the inlet 3 and the outlet 4, that is to say away from the throughflow axis DA. Accordingly, it is possible for the throughflow of the fluid through the connection housing 2 to be released again in that, by rotating the core piece 6, the core piece inlet 6a and the core piece outlet 6b are rotated to the throughflow axis DA. Moreover, the core piece 6 has a receptacle 7 which, just like the connection opening 5, is oriented in the direction of the functional unit 10, that is to say in the same direction. This allows the functional unit 10 to engage, in the connected state, into the receptacle 7. Here, the core piece inlet 6a and the core piece outlet 6b are in each case connected to the receptacle 7, and so the fluid is able to flow in the direction of the functional unit 10.

The functional unit 10 is set up selectively for conducting, treating and/or determining parameters of the fluid. For this purpose, the functional unit 10 contains, as shown in FIG. 1, a functional module 11a which contains for example means for descaling, filtering, pressure reduction, monitoring, germ reduction, determining chemical and microbiological parameters, determining pH, electrical conductivity, nitrate, nitrite, sulphate, carbon dioxide, iron, fluoride, chlorine, copper, phosphate, silicon, ammonium, hardness, temperature, throughflow rate, carbonate, salinity, germ content or metal content, data storage, communication, for example via radio, and/or display.

The functional unit 10 furthermore contains an insert 10a, which preferably engages into the receptacle 7 of the core piece 6 in a form-fitting manner and has a throughflow channel which connects the core piece inlet 6a and the core piece outlet 6b and through which fluid flows. Moreover, the functional unit 10 or the insert 10a contains a sealing device 12a and a sealing device 12b (not illustrated in FIG. 1), which seal off the functional unit 10 with respect to the core piece 6. The insert 10a may also preferably contain inlet and outlet channels (not illustrated in FIG. 1) which are arranged inside the functional unit 10 and which conduct the fluid to the functional module 11a. In addition, there is provided a cover 10b which is set up for fastening the functional module 10 to the connection housing 2. It is expediently possible via a holder 13 for the core piece 6 to be held rotatably inside the connection housing 2 in that the holder 13 prestresses the cover 10b against the core piece 6 or the connection housing 2. For this purpose, the holder 13 is fastened for example via screws 14 and threaded bores 8 to the connection housing 2. Alternatively, it is possible for a clamping ring or some other type of fastening known from the prior art to be provided.

Figure 2:
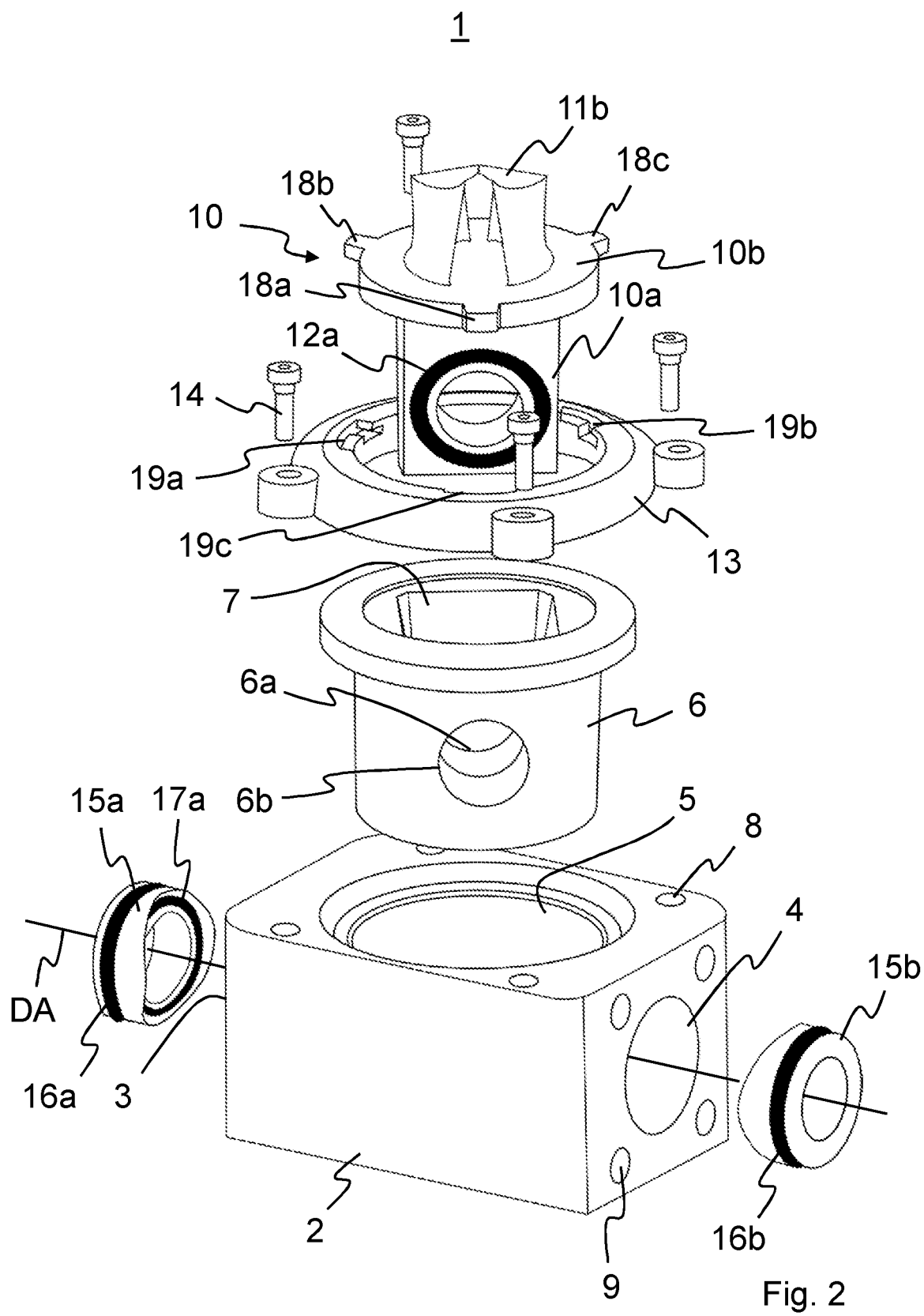
FIG. 2 is an exploded, perspective view of a further configuration of the arrangement according to the invention.

In FIG. 2, a further expedient configuration of the present invention is illustrated. The arrangement 1 has two sealing elements 15a, 15b which are arranged in the region of the inlet 3 and the outlet 4 and serve for sealing off the connection housing 2 with respect to the core piece 6 via sealing devices 16a, 16b, 17a, 17b. Alternatively, as illustrated in FIG. 1, the sealing elements 15a, 15b may also be arranged inside the core piece 6.

The functional unit 10 in FIG. 2 has a grip 11b instead of the functional module 11a and thus serves solely as a placeholder module which allows fluid throughflow without fluid treatment or parameter measurement being carried out, that is to say contains purely a fluid-conducting function. However, it is also possible for the arrangement 1 in FIG. 2 to be equipped with any other specified functional unit 10 for conducting, treating and/or determining parameters of the fluid. For this purpose, the functional unit 10 is inserted in a simple manner into the receptacle 7 of the core piece 6 along the direction of connection AR.

Figure 3:
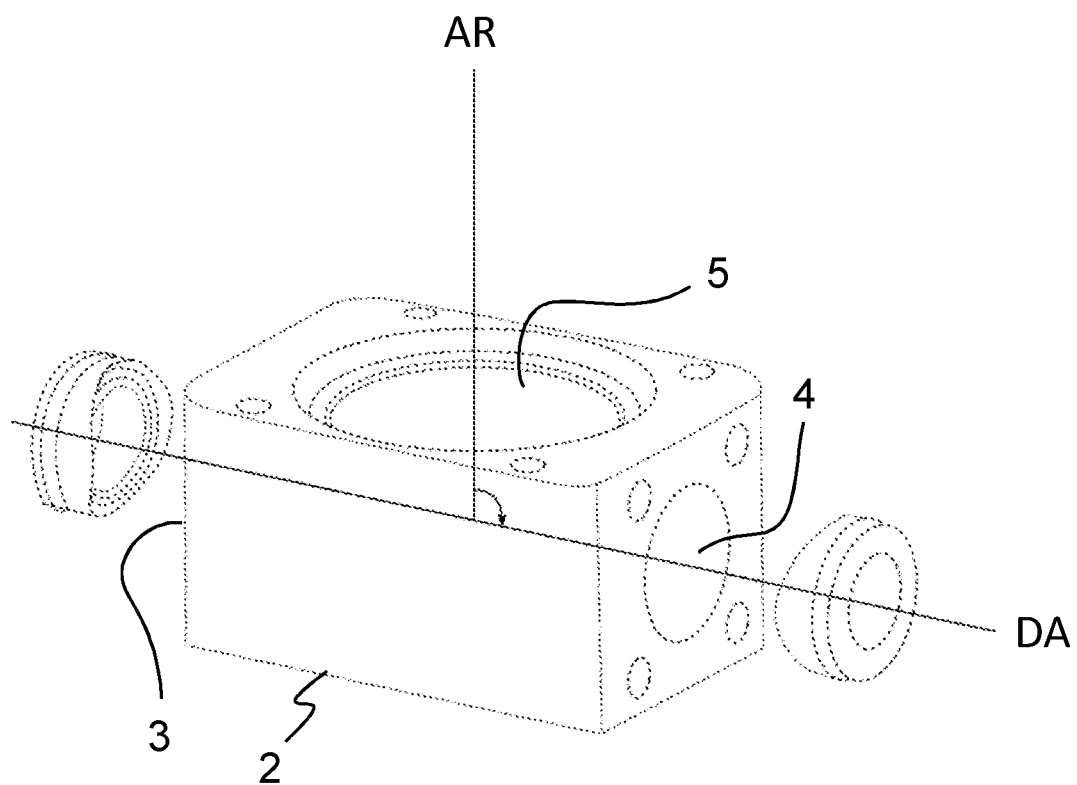
FIG. 3 is a perspective view of a direction of connection and of a throughflow axis on a basis of a connection housing of the arrangement from FIG. 2.

FIG. 3 illustrates the course of the throughflow axis DA, and the axis of the direction of connection AR of the functional unit. In this case, the throughflow axis DA and the direction of connection AR are preferably arranged such that they run substantially orthogonally with respect to one another.

The functional unit 10 and the holder 13 have means for establishing a mechanically releasable connection between the functional unit 10 and the connection housing 2 or holder 13. On the functional unit 10, projections 18a, 18b, 18c which engage into corresponding recesses 19a, 19b, 19c of the holder 13 are provided as means. As illustrated in FIG. 2, a bayonet closure is involved, which makes it possible for the functional unit 10 to be fixed inside the core piece 6 by pushing the unit into the core piece 6 and then rotating the unit through for example 45°, and for the rotational movement of the core piece 6 to be limited. The bayonet closure is also set up for exerting prestress on sealing elements, such as for example sealing devices 12a, 12b, 17a, 17b. In this case, rotating the functional unit 10 also results in the core piece 6 being rotated along therewith, as a consequence of which the throughflow through the connection housing 2 and the core piece 6 is released and/or blocked. Practically, the installation or deinstallation of the functional unit 10 thus at the same time contains the blocking and/or release of the throughflow through the connection housing 2, that is to say the arrangement 1 according to the invention at the same time contains a blocking mechanism of the pipeline.

The arrangement 1 thus provides a mechanism for the modular installation of functional units 10 or functions into the fluid line network. Here, by manually rotating the functional unit 10 or the core piece 6, the user can set a standard fluid throughflow (for example using the placeholder module in the case of which fluid flows through the fitting without being obstructed or influenced), a fluid diversion (for example based on a diversion through a functional module 11a with fluid influencing and/or parameter measurement) or a fluid stop (for example in the case of a deinstalled functional unit 10, or of a particular position or specific angle of rotation of the core piece 6).

Figure 4:
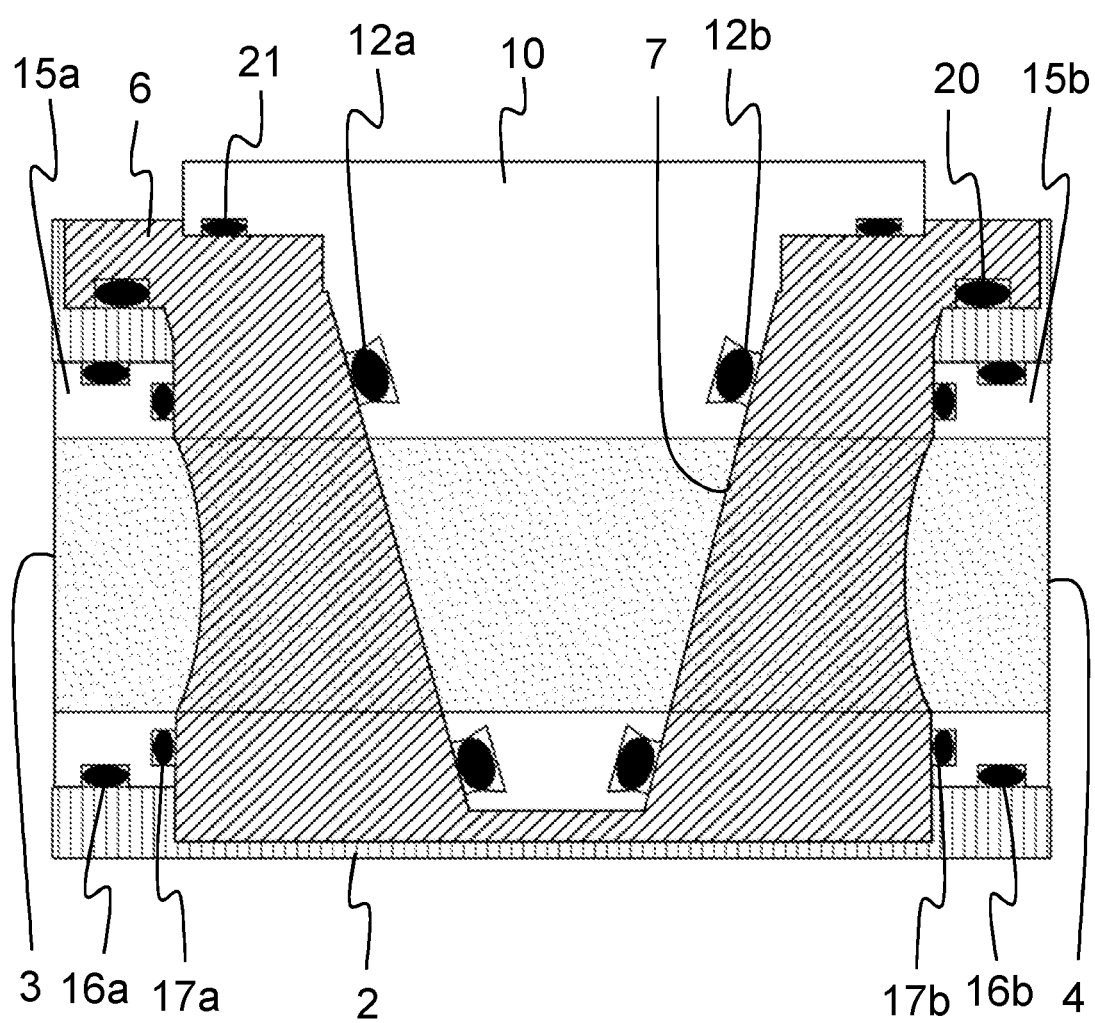
FIG. 4 is a simplified sectional view through the further configuration of the arrangement according to the invention.

The fluid tightness of the entire mechanism constitutes a particular requirement of the arrangement 1. For this purpose, the arrangement 1 contains various sealing elements, the arrangement of which is essentially shown in FIG. 4 by means of a sectional illustration. The fluid is illustrated in FIG. 4 using dotted hatching. The functional unit 10 is sealed off with respect to the core piece 6 via two sealing devices 12a, 12b in the region of the fluid throughflow and via an additional O-ring 21 in the region of the receptacle 7. The O-ring 21 merely constitutes an additional sealing measure and thus need not necessarily be provided. Optionally, the core piece 6 may also be sealed off with respect to the connection housing 2 via an additional O-ring 20. In addition, it is possible for yet further sealing elements (not illustrated in FIG. 4) to be provided, which, for example, seal off the core piece 6 with respect to the connection housing 2. The sealing elements 15a, 15b contain in each case one sealing means 16a, 16b which acts radially against the connection housing 2 and one sealing device 17a, 17b which acts axially against the core piece 6. As shown in FIG. 4, an O-ring is preferably used as the sealing device 16a, 16b, 17a, 17b. A sealing design is consequently obtained, which seals the cylindrical surface of the core piece 6, and at the same time allows the functioning of the rotary mechanism, in that the sealing element 15a, 15b and the sealing means 17a, 17b which acts axially against the core piece 6 are matched to the contour of the core piece 6.

Figure 5:
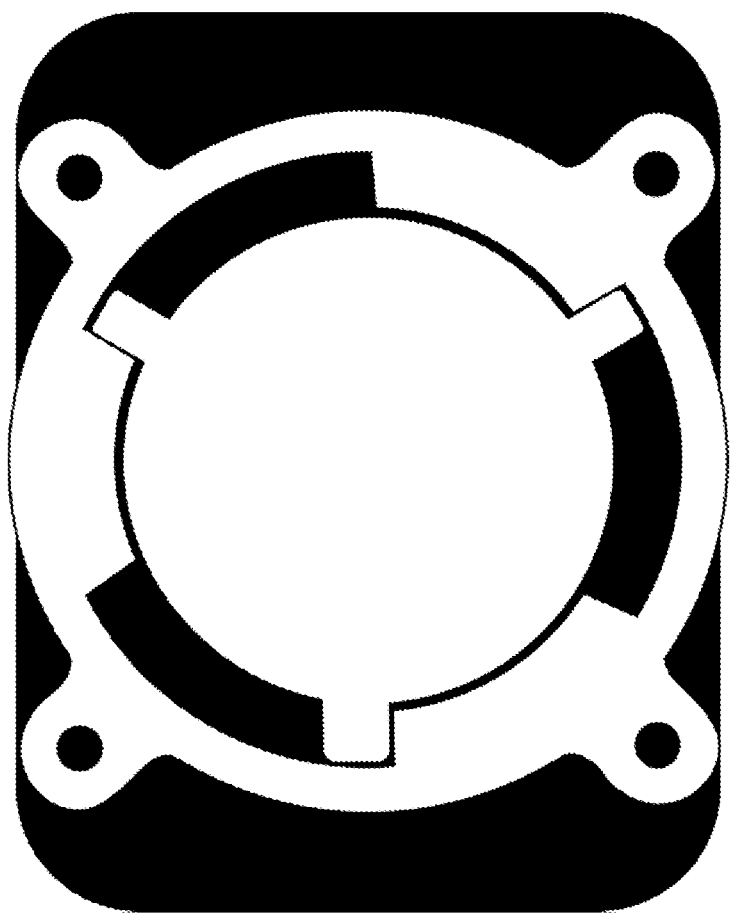
FIG. 5 is a highly simplified plan view of the further configuration of the arrangement according to the invention.

It is furthermore possible for error-free installation (according to "poka-yoke") of the functional unit to be realized in that, for example, the projections 18a, 18b, 18c are formed such that they are able to be inserted into the recesses 19a, 19b, 19c only in one orientation, for example according to a key-lock principle. As illustrate in FIG. 5 on the basis of a simplified plan view of the functional unit 10 and the holder 13, this may be realized for example via the width of the projections 18a, 18b, 18c. Alternatively, the contours or the number of the projections 18a, 18b, 18c and recesses 19a, 19b, 19c may be varied.

In summary, the arrangement 1 according to the invention has inter alia the advantage that the possibility exists for fitting functional units 10 without the use of tools, which essentially requires no specialist knowledge on installation. Such an installation saves time in comparison with previous fitting operations and requires no additional fluid blockage. It is thus possible for users to exchange functional units 10 independently by means of installation according to "poka-yoke" without consulting specialist personnel.

Combinations of individual features (sub-combinations) and possible combinations (not shown in the figures of the drawing) of individual features of different configurations are also expressly covered by the disclosure content.

The following is a summary list of reference numerals and the corresponding structure used in the above description of the invention:

1 Arrangement
2 Connection housing
3 Inlet
4 Outlet
5 Connection opening
6 Core piece
6a Core piece inlet
6b Core piece outlet
7 Receptacle
8 Threaded bore
9 Threaded bore
10 Functional unit
10a Insert
10b Cover
11a Functional module
11b Grip
12a, 12b Sealing means
13 Holder
14 Screw
15a, 15b Sealing element
16a, 16b Sealing means
17a, 17b Sealing means
18a, 18b, 18c Projection
19a, 19b, 19c Recess
20 O-ring
21 O-ring
AR Direction of connection
DA Throughflow axis

The invention claimed is:

1. A configuration for installation into a pipeline of a fluid network, the configuration comprising:
  an exchangeable functional unit;
  a connection housing having an inlet, an outlet, and a connection opening formed therein for connection to said exchangeable functional unit;
  a core piece rotatably disposed in said connection housing, a rotation of said core piece makes it possible for a throughflow of a fluid through said connection housing to be blocked or released, said core piece having a receptacle for connection of said exchangeable functional unit, said receptacle and said connection opening are oriented in a same direction;
  said receptacle connected to said exchangeable functional unit such that rotation of said exchangeable functional unit rotates said core piece, to selectively release or block throughflow through said connection housing and said core piece;
  said core piece being held rotatably in said connection housing by a holding ring;

said exchangeable functional unit having fasteners enabling a mechanically releasable connection of said exchangeable functional unit to said holding ring; and said exchangeable functional unit is formed such that it is able to be locked in at least one rotational position to said holding ring.

2. The configuration according to claim 1, wherein said inlet and said outlet are disposed along a throughflow axis, and a direction of connection of said exchangeable functional unit runs substantially orthogonally with respect to the throughflow axis.

3. The configuration according to claim 1, wherein said core piece is inserted into said connection opening.

4. The configuration according to claim 1, further comprising projections disposed on said exchangeable functional unit as said fasteners for establishing the mechanically releasable connection and the projections engage into corresponding recesses of said holding ring.

5. The configuration according to claim 1, wherein said fasteners for establishing the mechanically releasable connection include a bayonet closure.

6. The configuration according to claim 1, wherein said exchangeable functional unit has a seal which seals off said exchangeable functional unit with respect to said core piece.

7. The configuration according to claim 1, wherein said exchangeable functional unit has a connection geometry.

8. The configuration according to claim 1, wherein said exchangeable functional unit is selected from the group consisting of: a placeholder functional unit, a descaling functional unit, a filtering functional unit, a pressure reduction functional unit, a monitoring functional unit, a germ reduction functional unit, a functional unit for determining chemical and microbiological parameters, a functional unit for determining pH, electrical conductivity, nitrate, nitrite, sulphate, carbon dioxide, iron, fluoride, chlorine, copper, phosphate, silicon, ammonium, hardness, temperature, carbonate, salinity, germ content or metal content, data functional unit, a communication functional unit, a display functional unit and a function unit performing a combination of these recited units.

9. The configuration according to claim 1, wherein said core piece has a core piece inlet and a core piece outlet disposed opposite said core piece inlet.

10. The configuration according to claim 9, wherein said core piece inlet and said core piece outlet are in each case connected to said receptacle.

11. The configuration according to claim 9, wherein by rotating said core piece inside said connection housing, said inlet and said outlet of said connection housing, and said core piece inlet and said core piece outlet of said core piece, are able to be brought into fluidic connection.

12. The configuration according to claim 9, wherein said exchangeable functional unit has a throughflow channel which, in a connected state, is situated inside said core piece and is connected to said core piece inlet and said core piece outlet.

13. The configuration according to claim 1, further comprising a sealing element for sealing off said connection housing with respect to said core piece, said sealing element is disposed in a region of said inlet and/or said outlet.

14. The configuration according to claim 13, wherein said sealing element has a first seal which acts radially, against said connection housing, and a second seal which acts axially, against said core piece.

* * * * *